(12) United States Patent
Meiri (10) Patent No.: US 9,321,508 B2
(45) Date of Patent: Apr. 26, 2016

(54) PEDALING SCOOTER DEVICE

(76) Inventor: Dror Meiri, Eliezri (IL)

( * ) Notice: Subject to any disclaimer, the term of this patent is extended or adjusted under 35 U.S.C. 154(b) by 1415 days.

(21) Appl. No.: 13/084,783

(22) Filed: Apr. 12, 2011

(65) Prior Publication Data

US 2015/0259029 A1    Sep. 17, 2015

(51) Int. Cl.
| | |
|---|---|
| B62M 1/26 | (2013.01) |
| B62M 1/28 | (2013.01) |
| B62K 3/00 | (2006.01) |
| B62K 5/02 | (2013.01) |
| B62J 1/00 | (2006.01) |
| B62M 6/40 | (2010.01) |

(52) U.S. Cl.
CPC ... *B62M 1/26* (2013.01); *B62J 1/00* (2013.01); *B62K 3/002* (2013.01); *B62K 5/02* (2013.01); *B62M 1/28* (2013.01); *B62M 6/40* (2013.01)

(58) Field of Classification Search
CPC ............ B62K 5/02; B62M 1/26; B62M 1/28; B62J 1/00
See application file for complete search history.

(56) References Cited

U.S. PATENT DOCUMENTS

| | | | | |
|---|---|---|---|---|
| 1,581,168 | A * | 4/1926 | Bullermann | 280/221 |
| 1,679,170 | A * | 7/1928 | O'Brien | 280/7.14 |
| 2,053,835 | A * | 9/1936 | Kimball et al. | 280/251 |
| 2,251,005 | A * | 7/1941 | Rubinich | 280/258 |
| 3,913,946 | A * | 10/1975 | Valentine et al. | 280/236 |
| 4,779,863 | A * | 10/1988 | Yang | 482/51 |
| 4,846,488 | A * | 7/1989 | Szadkowski | 280/221 |
| 5,224,724 | A * | 7/1993 | Greenwood | 280/221 |
| 6,419,251 | B1 * | 7/2002 | Chueh | 280/221 |
| 7,044,488 | B1 * | 5/2006 | Hamend | 280/221 |
| 2003/0001349 | A1 * | 1/2003 | Eschenbach | 280/62 |
| 2003/0001350 | A1 * | 1/2003 | Eschenbach | 280/63 |
| 2003/0111821 | A1 * | 6/2003 | Chow | 280/256 |
| 2004/0036249 | A1 * | 2/2004 | McGuire et al. | 280/253 |
| 2006/0038373 | A1 * | 2/2006 | von Detten | 280/221 |
| 2006/0249925 | A1 * | 11/2006 | Yan | 280/252 |
| 2008/0129007 | A1 * | 6/2008 | Lee | 280/242.1 |
| 2009/0200768 | A1 * | 8/2009 | Armand et al. | 280/221 |
| 2010/0001487 | A1 * | 1/2010 | Pang | 280/221 |

(Continued)

FOREIGN PATENT DOCUMENTS

| | | |
|---|---|---|
| CN | 201169357 | 12/2008 |
| EP | 1413507 A1 | 4/2004 |

(Continued)

*Primary Examiner* — Kevin Hurley
*Assistant Examiner* — Gabriela C Craciun
(74) *Attorney, Agent, or Firm* — Browdy and Neimark, PLLC (57) ABSTRACT

The present invention discloses a. scooter device comprised of: a chassis body which connects the following components: a steering arrangement, one front wheel; two back wheel connected to at least one axle, where each wheel moves freely around the axle. a pedaling mechanism including a pedal normally positioned at an upper position above the standing platform connected by a shaft to a pedal axle and a spring connecting the pedal shaft to the chassis body for returning the pedal to upper position, a pedal transmission mechanism for translating the pedal motion into rotational motion of at least one back wheel's axle and a horizontal transmission mechanism arranged for transferring the rotational movement to at least one back wheel, said mechanism including at least one hollow cylinder attached on one side to a rolling bearing which is of clamped on at least one back wheel axle, and on the other side to one of the back wheels. The back wheel's cog wheel is clamped on the hollow cylinder.

13 Claims, 9 Drawing Sheets

(56) References Cited

U.S. PATENT DOCUMENTS

2010/0187790 A1* 7/2010 Yu .................................. 280/221
2011/0057412 A1* 3/2011 Owoc et al. ................... 280/257
2012/0104722 A1* 5/2012 Gunderson ................... 280/210

FOREIGN PATENT DOCUMENTS

| GB | 171825 | 12/1921 |
| WO | 2009035278 A2 | 3/2009 |

* cited by examiner

__PEDALING SCOOTER DEVICE__

BACKGROUND

1. Technical Field

The present invention relates to the field of pedaling devices, and more particularly, to a scooter pedaling device.

2. Prior Art

Different types of pedaling scooters are know in the art, some of the patents application such as US 2010001487, EP1413507 or WO2009035278 include two pedals requiring simultaneous movement of both legs when driving the scooter.

Chinese application no CN 201169357, disclose a pedaling scooter with a complex gear mechanism which is not fitted with normal operation of the scooter. Application NO. GB171825 uses a foot lever having direct transmission connection to the back wheel, which may intervene with normal operation of the scooter.

BRIEF DESCRIPTION OF THE DRAWINGS

The present invention will be more readily understood from the detailed description of embodiments thereof made in conjunction with the accompanying drawings of which.

SUMMARY OF THE INVENTION

The present invention disclose a scooter device comprised of: a chassis body connecting the following components: a steering arrangement, one front wheel, at least one back wheel connected to at least one axle, where each wheel moves freely around the axle, a pedaling mechanism including a pedal normally positioned at an upper position above the standing platform connected by a shaft to a pedal axle and a spring connecting the pedal shaft to the chassis body for returning the pedal to upper position where no pressure is applied on the pedal, a pedal transmission mechanism for translating the pedal motion into rotational motion of at least one back wheel's axle and a horizontal transmission mechanism arranged for transferring the rotational movement to at least one back wheel, said mechanism including a cog wheel and at least one hollow cylinder attached on one side to a rolling bearing which is of clamped on at least one back wheel axle, and on the other side to one of the back wheels.

According to some embodiments of the present invention the pedal transmission mechanism includes a chain connecting a cog wheel of the pedal axle to a cog wheel of the back wheels axle, wherein the back wheel's cog wheel is clamped on the hollow cylinder and the pedal cog wheel diameter is larger than the back wheel axis cog wheel.

According to some embodiments of the present invention the scooter includes two back wheels.

According to some embodiments of the present invention the hollow cylinder is comprised of two cylinders, a first cylinder connected to the rolling bearing and the second cylinder attached to the back wheel, wherein the cylinders are concocted with screws.

According to some embodiments of the present invention the scooter further comprises an electrical motor for powering the rotational motion generated by the pedal.

According to some embodiments of the present invention the two back wheels are connected to the same axle.

According to some embodiments of the present invention each back wheel is connected to a separate axle, wherein at least on axle support the horizontal transmission mechanism.

According to some embodiments of the present invention the horizontal transmission rotate both back wheels, where the horizontal transmission includes an additional hollow cylinder connected to the second back wheel.

According to some embodiments of the present invention the hollow cylinder includes a screw thread for connecting the back wheel According to some embodiments of the present invention the scooter further comprises a standing platform.

According to some embodiments of the present invention the scooter further comprises a seating platform.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a pedal scooter, providing a driving power to the conventional scooter enabling to the user to drive scooter when standing or sitting on the scooter by applying pressure of the scooter pedal.

Figure 1:
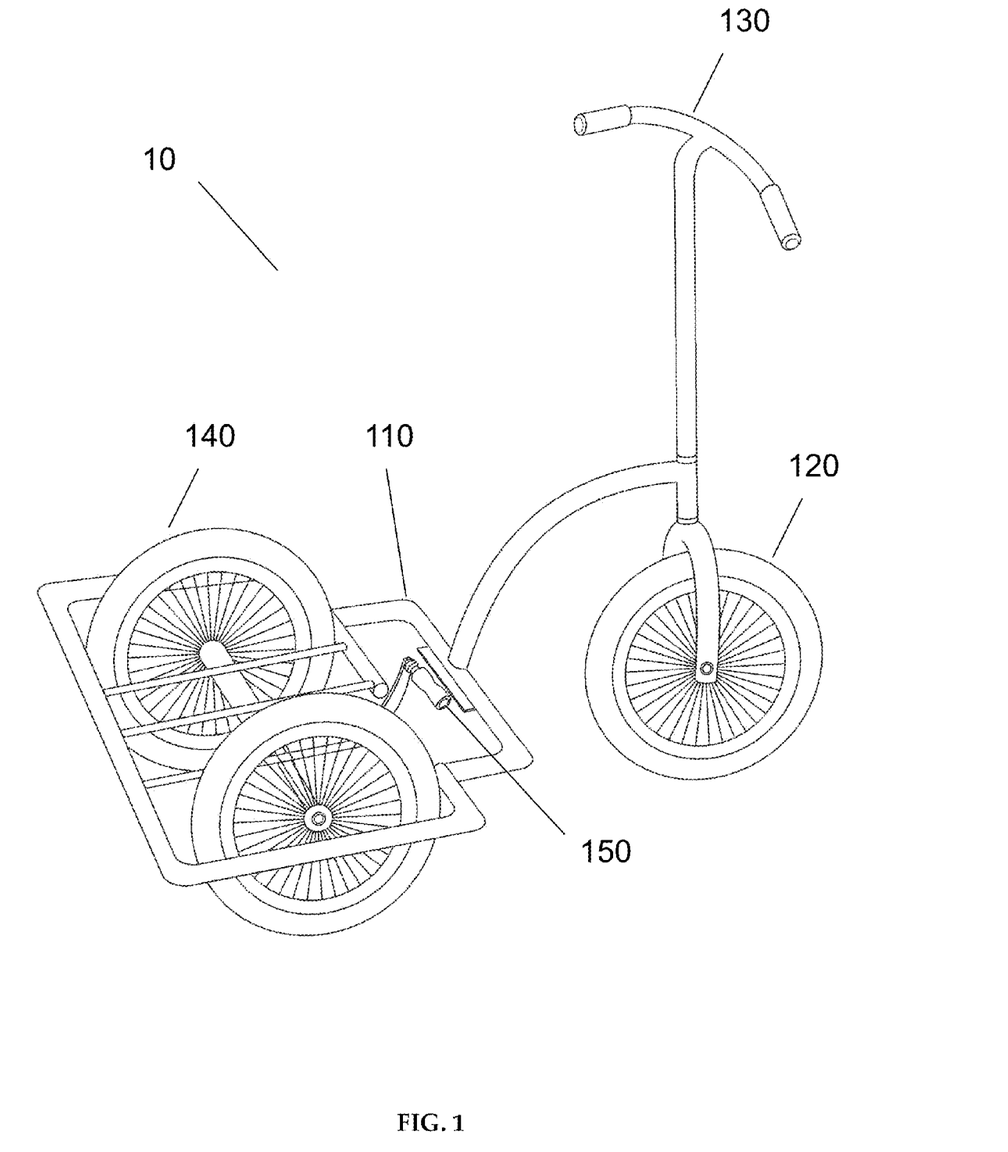
FIG. 1 illustrates the scooter device according to some embodiments of the present invention.

FIG. 1 illustrates the scooter device according to some embodiments of the present invention. The scooter is comprised of chassis frame interconnecting between two back wheels, one front wheel a steering arrangement for controlling the scooter drive direction, a standing or seating platform (not shown). When standing on the scooter the user can push the pedal with his right or left leg.

Figure 2:
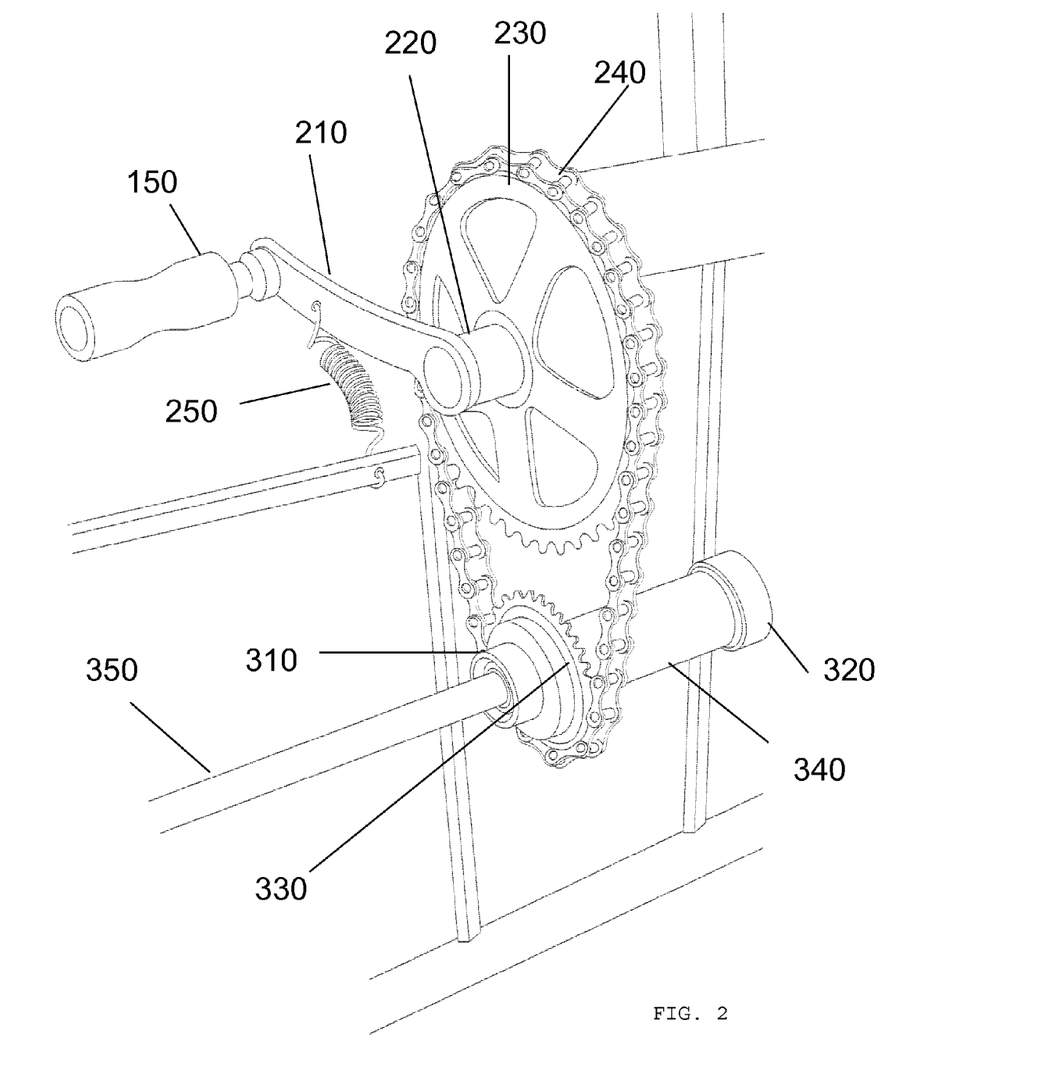
FIG. 2 illustrates the pedal transmission mechanism of the scooter device according to some embodiments of the present invention.

FIG. 2 illustrates the pedal transmission mechanism of the scooter device according to some embodiments of the present invention. The pedal 150 is attached to the shaft 210 which is connected to axle 220. The spring 250 connects between the pedal 150 and the frame 110 for retracting the pedal to its upper position when not under pressure. Cog wheel 230 mounted on the axle 220 supports the transmission of the rotational motion created by the pedal movement, to the cog wheel 330 through the chain 240. The pedal position can be changed between right and left position. For changing its' position the pedal can be rotated around the shaft 210.

The cog wheel 330 which includes a ratchet mechanism is mounted on a first cylinder 340. The cylinder 340 is attached on one side to the rolling bearing which is clamped on the axis 350, and on the second side to cylinder 320. This construction of the cylinders creates a horizontal transmission mechanism for transferring the motion of the cog wheel 330 to one of the back wheels. The use of the rolling bearing enable free rotation of the back wheels when the pedal is inactive. The ratchet mechanism allows continuous rotary motion of the cog wheel in only one direction while preventing motion in the opposite direction, hence when the user is not pedaling, the cog wheel is not preventing motion of the back wheels.

Figure 3:
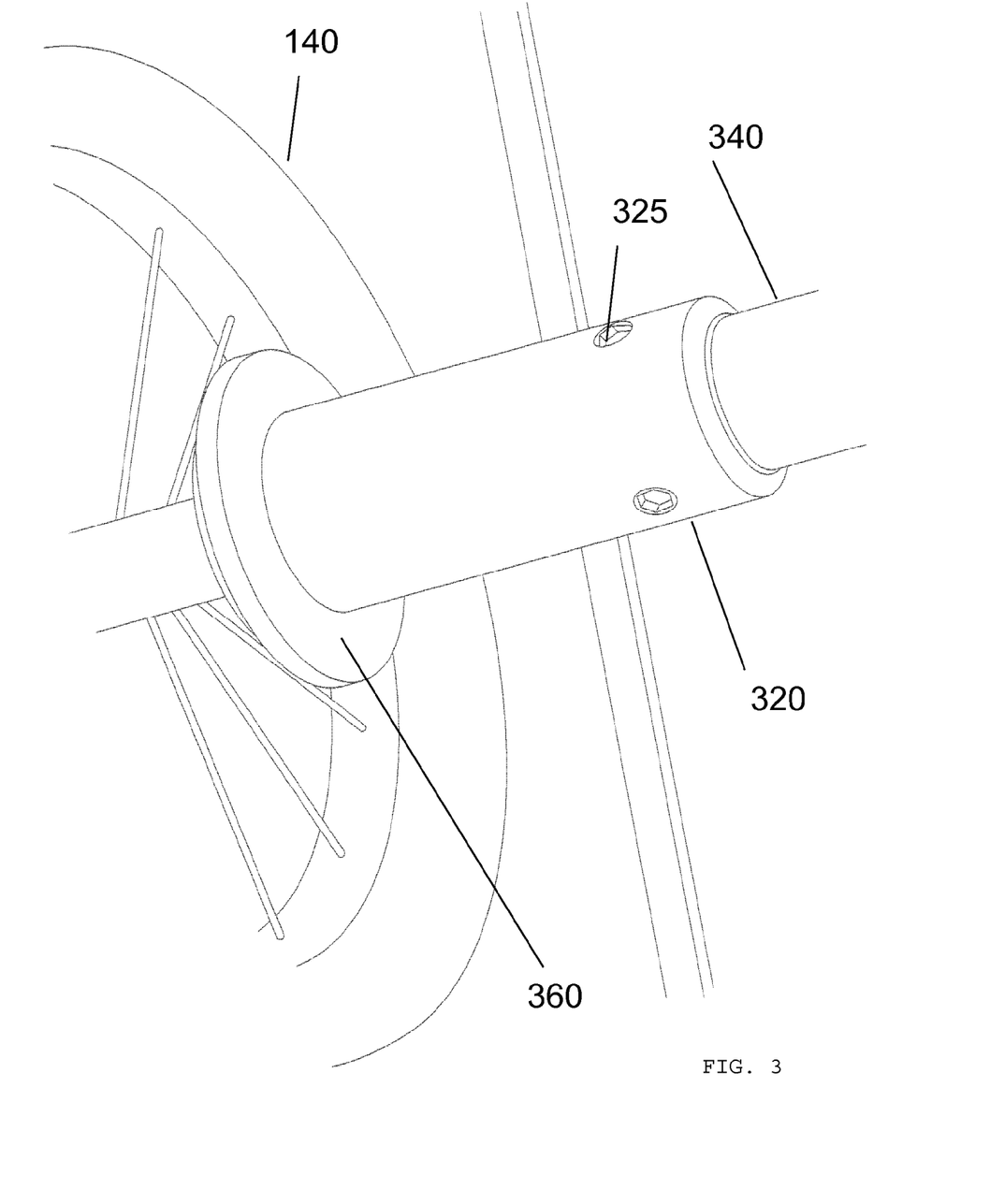
FIG. 3 illustrates a perspective view the connection of the vertical transmission to the back of the scooter device according to some embodiments of the present invention.

FIG. 3 illustrates perspective partial view of the horizontal transmission mechanism according to some embodiments of the present invention. The horizontal transmission mechanism includes the cylinders 340 and 320 which are attached with at least one screw 325. On the second end the cylinder 320 is connected to the back wheel axle 350.

Figure 4:
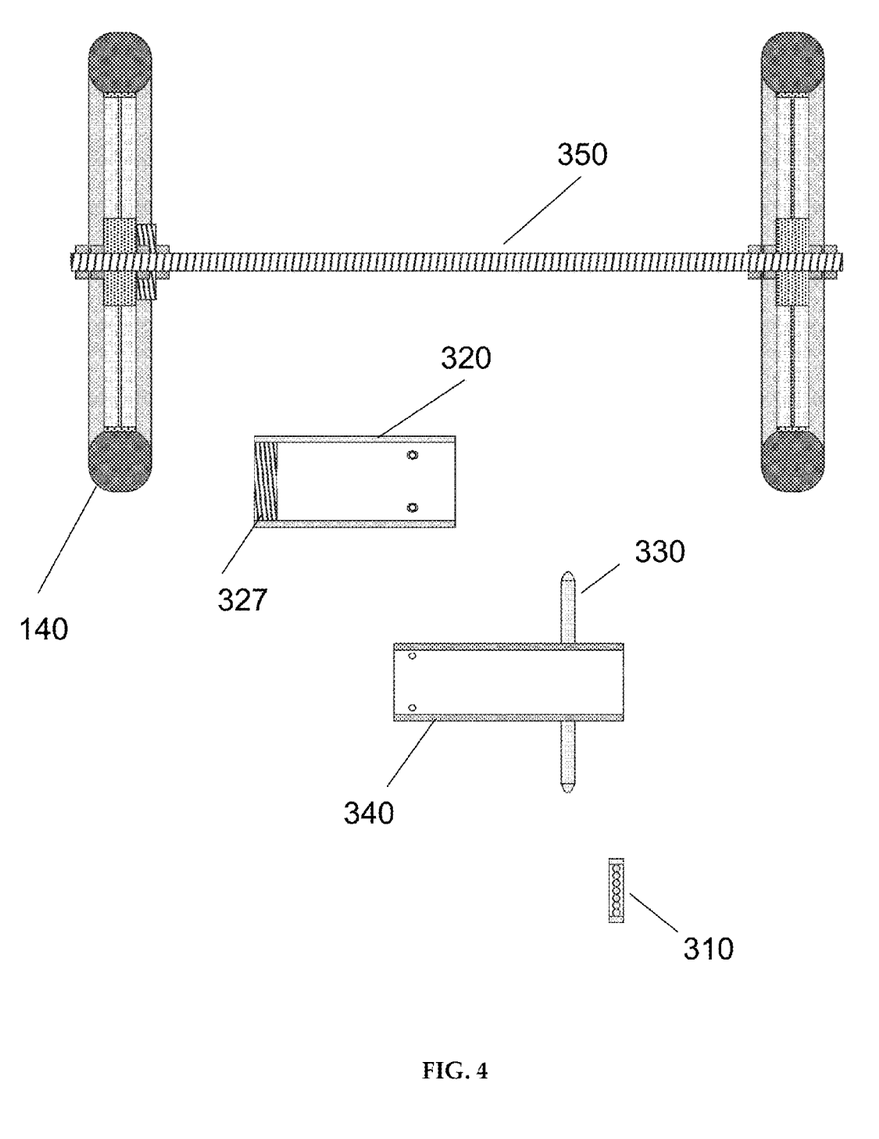
FIG. 4 illustrates an exploded cross sectional view drawing of the vertical transmission components in connection with back axis of scooter according to some embodiments of the present invention.

FIG. 4 illustrates is an exploded cross sectional view drawing of the horizontal transmission components in connection with back axis of scooter according to some embodiments of the present invention. The back wheels are connected to axle 350, such that enabling the back wheels to freely rotate about the axle 350. The cylinder 320 has internal screw thread 327 on one side for connecting the wheel, and holes on the other side for connecting to the cylinder 340. Cylinder 340 includes corresponding holes on one side to be attached to cylinder 360, on the second side are connected to the rolling bearing which is clamped on the axis 350. The rolling bearing 310 enables free rotation of the cylinder 340 around the axis 350. On the cylinder 340 is further mounted the cog wheel 330 having a ratchet mechanism for transforming one directional circular motion created by the pedal to the back wheel.

Figure 5:
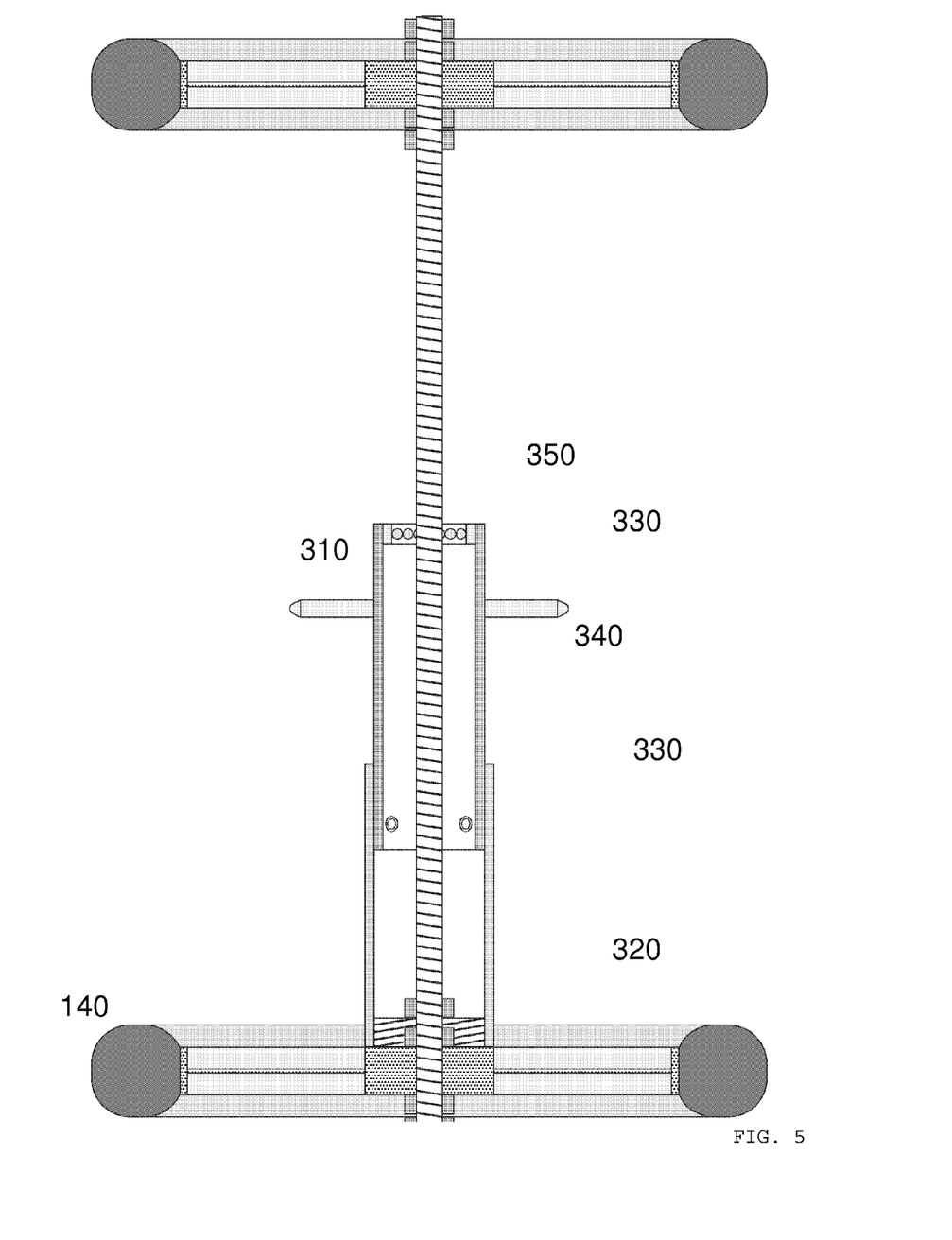
FIG. 5 a cross sectional view of the vertical transmission mechanism in connection with back axis of scooter according to some embodiments of the present invention.

FIG. 5 illustrates a cross sectional view of the vertical transmission mechanism in connection with back axis of scooter according to some embodiments of the present invention.

The two connected cylinders are screwed on one side to the back wheel 140 and on the other side connected to the axle 350 through the rolling bearing 310. The cylinder 350 is rotated by cog wheel 330, thereby transferring the circular motion of the cog wheel to the back wheel 140. The construction using the two cylinders is optional and one cylinder can be used instead. The use of two cylinders is provided to enable easy maintenance of the scooter when replacing or fixing the back wheel, the screw connection of the cylinders can be easily opened, maintaining the rest of the mechanism untouched.

According to some embodiments of the present invention the axle 330 may be connected only to one back wheel, the second wheel can be connected to a separate axle which is attached directly to the frame of the scooter.

According to some embodiments of the present invention the scooter further comprises an electrical motor for generating power in addition to the rotational motion created by the pedal.

Figure 6:
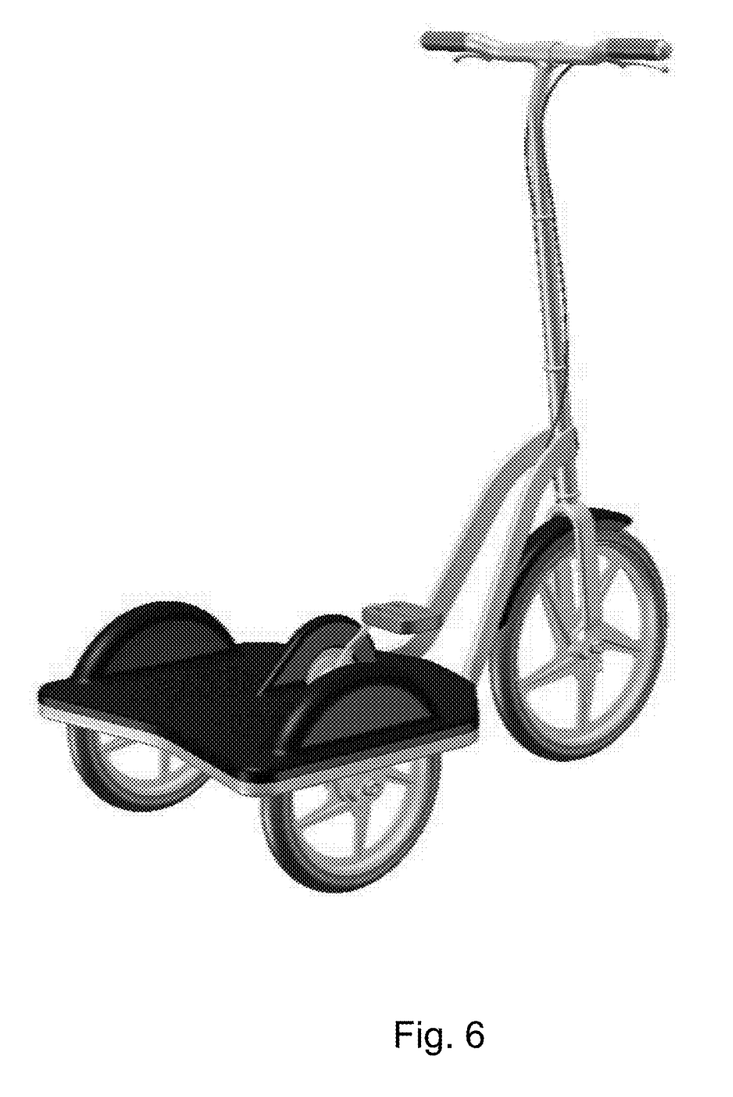
FIG. 6 an illustration of the scooter design according to some embodiments of the present invention.

FIG. 6 is an illustration of the scooter design according to some embodiments of the present invention.

Figure 7:
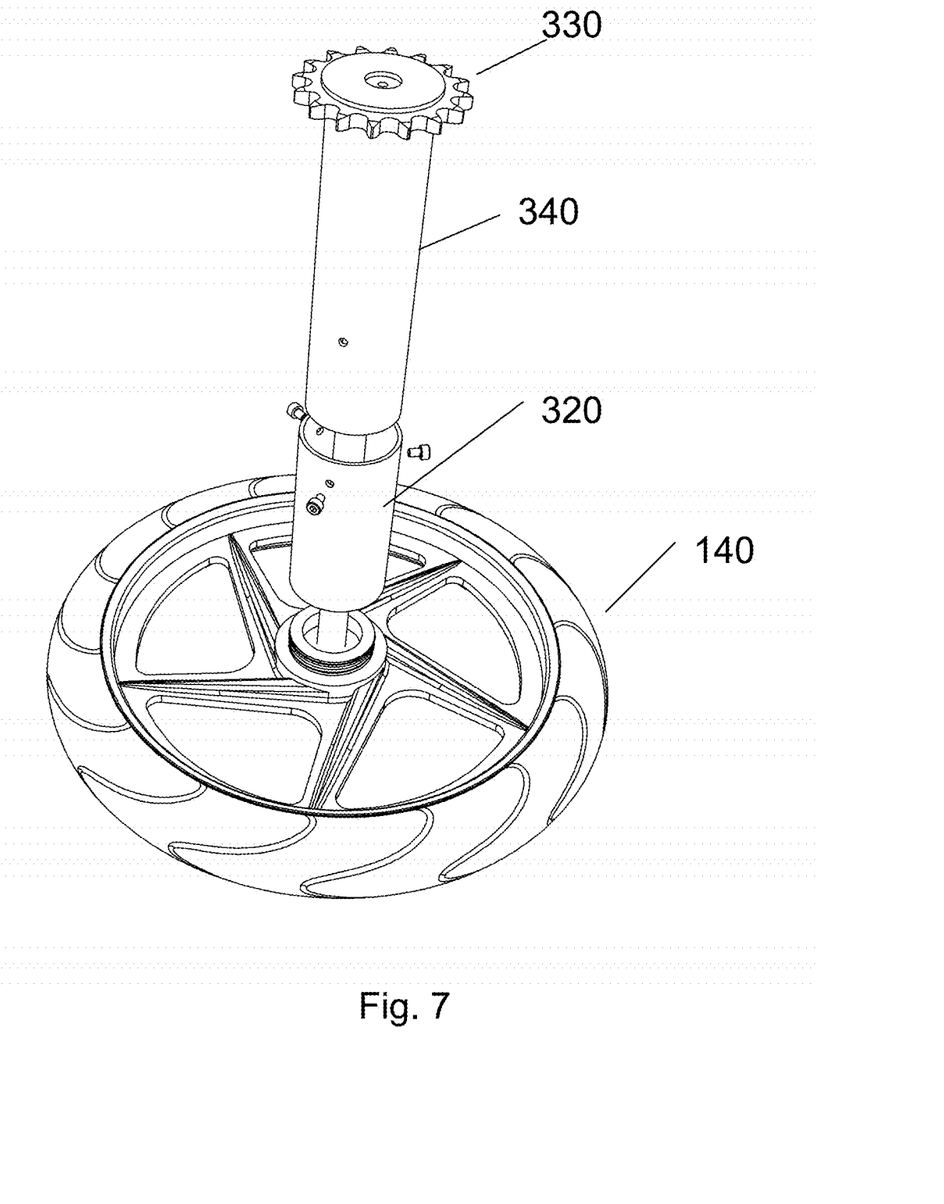
FIG. 7 illustrates an exploded perspective view of the vertical transmission to the back of the scooter device according to some embodiments of the present invention.

FIG. 7 illustrates an exploded perspective view of the vertical transmission to the back of the scooter device according to some embodiments of the present invention. The horizontal transmission includes a cog wheel 330 having a ratchet mechanism which is mounted on the cylinder 340. The cylinder 340 is connected to cylinder 320 which is attached to the back wheel 140.

Figure 8:
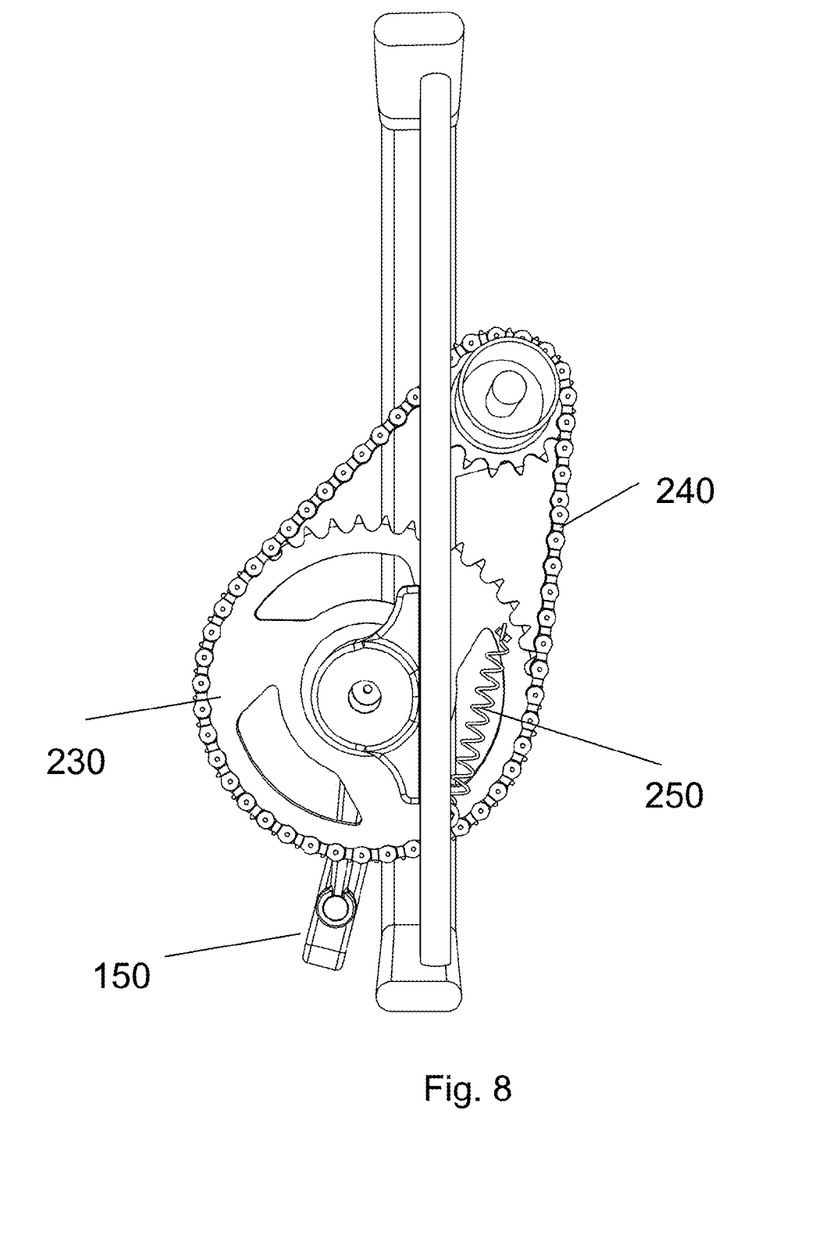
FIG. 8 illustrates an exploded perspective view of the transmission mechanism between the pedal and the rear cog wheel according to some embodiments of the present invention.
Figure 9:
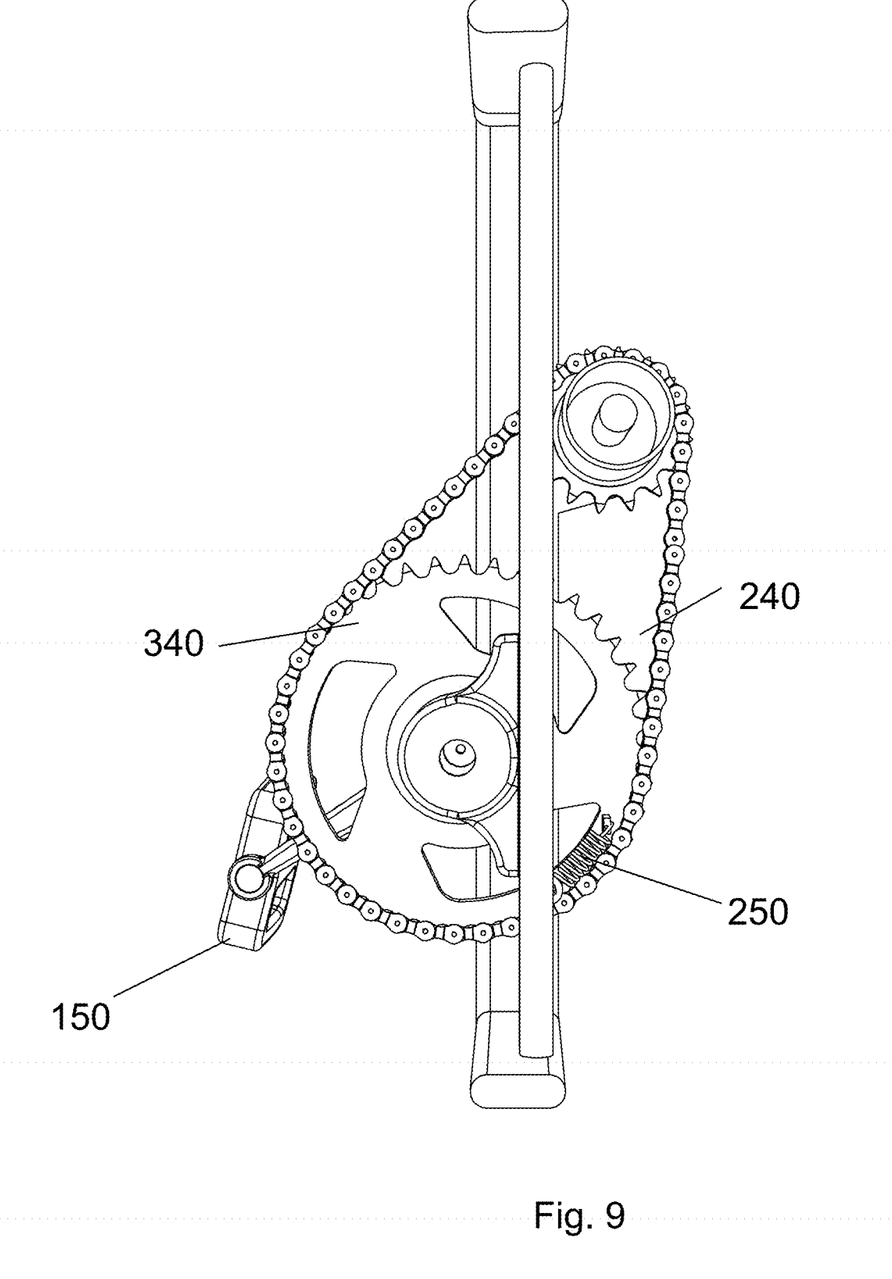
FIG. 9 illustrates an exploded perspective view of the transmission mechanism between the pedal and the rear cog wheel according to some embodiments of the present invention.

FIGS. 8 and 9 illustrate an exploded perspective view of the transmission mechanism between the pedal and the rear cog wheel according to some embodiments of the present invention.

In this embodiment the spring 250 is connected on one side to the pedal and on the other side to cog wheel 240. FIG. 8 illustrates the state in which the pedal is pressed and the spring stretched.

FIG. 9 illustrates the state in which the pedal is in released upper position and the spring is in released position.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments.

Other possible variations, modifications, and applications are also within the scope of the invention. Accordingly, the scope of the invention should not be limited by what has thus far been described, but by the appended claims and their legal equivalents.

The invention claimed is:

1. A scooter device comprised of:
   a chassis body;
   a steering arrangement;
   at least one front wheel;
   at least one back wheel each pivotally connecting to at least one axle, wherein each of said at least one back wheel is configured to move freely about a back wheel axle;
   a pedaling mechanism comprising at least one pedal pivotally connecting to a pedal axle via at least one shaft;
   at least one spring connecting at one end thereof to the pedal shaft and at the other end thereof to at least one stable part of the scooter for returning the pedal to an upright position; and
   a transmission mechanism for translating the pedal motion into rotational motion of at least one of said at least one back wheel, said transmission mechanism comprising at least one cogwheel and at least one ratchet mechanism,
   wherein said transmission mechanism is operatively connected to the pedaling mechanism for having said at least one cogwheel thereof being rotated thereby, and
   wherein said at least one ratchet mechanism is configured to prevent rotation of said at least one back wheel which said at least one ratchet mechanism operates once the pedal is returned to the upright position by disengaging the axle of said at least one back wheel upon rotation of the pedal axle when said at least one spring returns said pedal to the upright position, said at least one ratchet only allows rotation of said at least one back wheel in one direction when the pedal is pressed downwardly causing thereby the compressing of said at least one spring and the rotational movement of said at least one back wheel.

2. The scooter of claim 1, wherein said transmission mechanism further comprises a chain and two cogwheels: a first cogwheel coaxially and pivotally connected to the pedal axle and a second cogwheel, both cogwheels engaging said chain such that the rotation of the first cogwheel will rotate said second cogwheel via said chain.

3. The scooter of claim 1, wherein said at least one spring is fixedly connected to the chassis body at one end thereof and to pedal shaft at the other end thereof.

4. The scooter of claim 2, wherein said at least one spring is connected to the pedal cog wheel.

5. The scooter of claim 1 including two back wheels.

6. The scooter of claim 2, wherein said transmission mechanism further comprises two hollow cylinders coaxially arranged in respect to one another wherein an outer hollow cylinder connects to the center of said second cogwheel and an inner cylinder engages said outer cylinder via at least one bearing.

7. The scooter of claim 5, wherein the two back wheels are connected to the same axle.

8. The scooter of claim 5, wherein each back wheel is connected to a separate axle, wherein at least one axle thereof supports said transmission mechanism.

9. The scooter of claim 5, wherein said transmission mechanism rotates both back wheels, where said transmission includes an additional hollow cylinder connected to the second back wheel.

10. The scooter of claim 1, wherein the hollow cylinder include a screw thread for connecting the back wheel.

11. The scooter of claim 1 further comprising a standing platform connected to said chassis body.

12. The scooter of claim 1 further comprising a seating platform chassis body.

13. The scooter of claim 1, wherein the pedal position can be changed between right and left position by rotating around the pedal shaft.

* * * * *